May 29, 1973  J. H. HARRISON ET AL  3,736,187
PRESSURE EQUILIBRATED GAS FUEL CELLS AND METHOD
Filed Sept. 14, 1971  2 Sheets-Sheet 2

INVENTORS
JOHN H. HARRISON
ROBERT J. BOWEN
HERMAN B. URBACH
DAVID E. ICENHOWER
BY
ATTORNEY

United States Patent Office 3,736,187
Patented May 29, 1973

3,736,187
PRESSURE EQUILIBRATED GAS FUEL CELLS AND METHOD
John H. Harrison, Severna Park, Robert J. Bowen and Herman B. Urbach, Annapolis, and David E. Icenhower, Glenn Dale, Md., assignors to the United States of America as represented by the Secretary of the Navy
Continuation-in-part of application Ser. No. 844,767, July 25, 1969. This application Sept. 14, 1971, Ser. No. 180,351
Int. Cl. H01m 27/00
U.S. Cl. 136—86 B    4 Claims

ABSTRACT OF THE DISCLOSURE

A self-pressurized fuel cell system for operation at deep sea ambient pressures includes a fuel cell having oxygen and fuel manifolds. Oxygen is produced and fed within the system to the oxygen manifold, and a fuel solution is produced and fed within the system to the fuel manifold. Pressure is maintained within a relatively flexible low strength housing surrounding the cell substantially the same as pressure ambient to the housing due to byproduct gases produced by the cell being fed to the housing.

CROSS REFERENCES TO RELATED APPLICATIONS

This application is a continuation-in-part of application Ser. No. 844,767 filed July 25, 1969, now abandoned.

The invention described herein may be manufactured and used by or for the Government of the United States of America for governmental purposes without the payment of any royalties thereon or therefor.

BACKGROUND OF THE INVENTION

The present invention relates to a fuel cell system for use in an ocean environment and more particularly to a new and improved fuel cell system which eliminates the need for a pressurized hull.

Fuel cells are electrochemical energy conversion devices similar to batteries except that they are provided with continuous feeding of both fuel and oxidant. Examples of such are hydrazine-oxygen and hydrogen-oxygen fuel cells. The prior art includes the teaching that pressurized operation of the electrodes of the cells increases their efficiency, potential and power density. However, the prior art systems employed the use of pumps external to the fuel cell to increase pressure about the cells, the result of which was that while the cell efficiency itself was increased, the power required by the pump lowered the overall system efficiency.

The prior art also includes encapsulated fuel cell systems housed in pressure hulls and intended to operate in essentially an atmospheric environment. These systems display space, weight and cost disadvantages. There are, therefore, outstanding requirements for fuel cell systems which can maintain a high overall efficiency while not requiring a pressure hull. Such requirements have proved difficult to achieve in the past, however, the present invention does teach an apparatus capable of meeting these requirements.

OBJECTS OF THE INVENTION

Accordingly, it is an object of the present invention to provide a new and improved fuel cell system.

Another object is to provide an improved fuel cell system capable of operation in an ocean environment at great depths without requiring a pressure hull.

A further object of the invention is the provision of a fuel cell system with improved overall efficiency and improved power density and potential.

Still another object is to provide a fuel cell system adaptable for use with a wide variety of undersea vehicles.

A still further object is to provide a self-pressurized fuel cell system.

Another object is to provide a fuel cell system with substantial savings in weight and volume over equivalent fuel cell systems.

Still another object is to provide a fuel cell system with substantial cost savings over fuel cell systems requiring pressure hulls.

Other objects and advantages, as well as the exact nature of the invention, will be readily apparent to those skilled in the art from the consideration of the following disclosure of the invention.

SUMMARY OF THE INVENTION

The present invention accomplishes the above cited objects by providing a fuel cell system which is suitable for deep ocean operation through use of the fuel cell's own byproduct gases to pressurize a relatively low strength housing.

More specifically, there is provided a fuel cell system in which a fuel cell includes oxygen and fuel manifolds. Oxygen and a fuel solution are produced and fed within the system to the oxygen and fuel manifolds respectively.

A relatively flexible gas tight housing, such as a flexible plastic, surrounds the cell and byproduct gases from the fuel cell are fed to the housing to maintain pressure therein substantially the same as pressure ambient to the housing. By keeping the pressure within the fuel cell housing at substantially the same pressure as the ambient sea pressure, the strength requirements for the housing material are minimal.

In practice, a relatively flexible, low strength, lightweight plastic can be used instead of the previously required, heavy, and costly metal type pressure hull operating at atmospheric pressure.

The disclosed invention, operating under ambient sea pressure, takes advantage of the fact that a given fuel cell will have greater power density, potential and efficiency when operating under pressure. By use of the byproduct gas rather than pumps to achieve this pressurization, the described benefits come without additional cost, volume, complexity or loss of any overall system efficiency.

A method of maintaining the internal pressure of the housing substantially the same as pressure ambient to the housing includes feeding an oxidant and a fuel solution to the fuel cell and feeding byproduct gases from the fuel cell to the housing while relieving byproduct gas pressure between the fuel cell and the housing only when the byproduct gas pressure exceeds pressure ambient to the housing by preset differential.

DESCRIPTION OF THE PREFERRED EMBODIMENT

Figure 1:
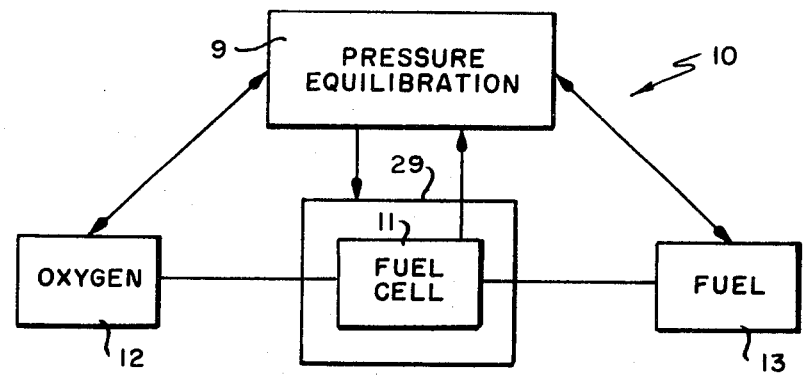
FIG. 1 is a block diagram generally illustrating the fuel cell system components of the preferred embodiment of this invention.

Referring now to the FIG. 1, there is shown a block diagram of a fuel cell system 10 constructed according to the teachings of this invention. The block diagram illustrates the functional position of the major components employed, including a fuel cell 11, with an indication of the direction of flow of the materials used.

As previously stated, conventional fuel cells such as fuel cell 11 require continuous feeding of a fuel plus an oxidant. That part of the system 10 shown to the left of the fuel cell 11 is the oxygen producing and feeding portion 12 while that part of the system shown to the right of fuel cell 11 is the fuel storage and feeding portion of the system 10. The invention relates to the self-pressurization means 9 and its benefits and is applicable to any fuel cell system where there is a gaseous byproduct or, of course, where a gas under pressure from an external source is available. It should be noted that some systems, such as a conventional hydrogen-oxygen system, which has a water byproduct, do not have a gaseous byproduct but the gases themselves could be used to provide pressurization and the invention described would be applicable to such systems. The preferred embodiment as shown illustrates the invention in relation to an oxygen-hydrazine fuel cell arrangement which has a gaseous byproduct. All materials used therein are easy to handle liquids.

In FIG. 1, block 12 represents the oxygen producing and feeding means of this invention. Ambient sea pressure acts on the oxygen system to supply oxygen to the fuel cell in block 11. Similarly, fuel is supplied from the fuel producing and feeding means of block 13 to the fuel cell of block 11. A housing 29 isolates the fuel cell of block 11 from the ambient sea pressure. A means for maintaining pressure within housing 29 substantially the same as pressure ambient to the housing is accomplished by a pressure equilibrating system in block 9. Note that the equilibrating system is interconnected with blocks 11, 12 and 13 of the fuel cell system so that the fuel cell system pressure may be maintained within preset references to the ambient sea pressure as will be later discussed in greater detail.

Figure 2:
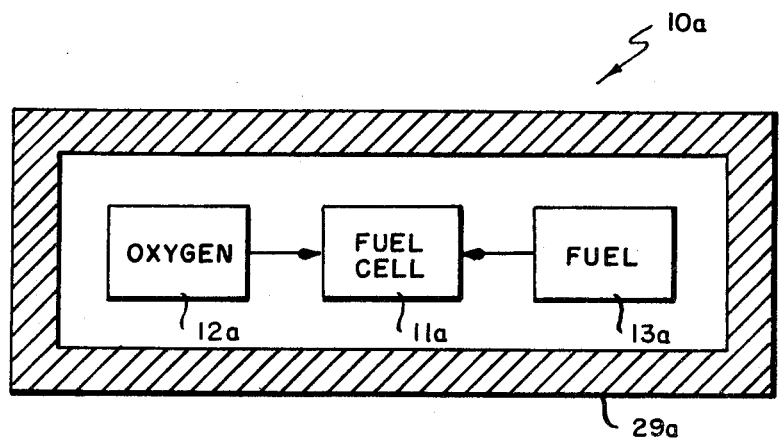
FIG. 2 is a block diagram generally illustrating a prior art fuel cell system as compared with the system of FIG. 1.

In FIG. 2, a prior art pressurized fuel cell system 10a comprises an oxygen producing and feeding means, block 12a, a fuel cell, block 11a and a fuel source, block 13a. However, the non-pressure-equilibrated prior art system is entirely enclosed in a relatively thick heavy duty pressure hull 29a which functions to isolate the entire system from the ambient sea pressure.

As a result of making the fuel cell system a pressure equilibrated system, an overall system efficiency is achieved especially as the ambient sea pressure increases at greater depths. The mass of the reactants of the system, i.e., oxygen and fuel, increases under pressure to provide a mass transfer effect and the free energy of the system increases to provide a thermodynamic effect.

The combination of interconnected fuel cell system components utilizing ambient sea pressure and various pressure valves within the system provide a desired system pressure fixed slightly above ambient pressure by a preset differential.

In comparing the advantages of the pressure equilibrated system of the present invention to the non-pressure-equilibrated prior art fuel cell systems it has been discovered that, for example, in systems designed for 1,000 kw. hours of energy a significant reduction in the weight of the overall system has been achieved. For example, a typical prior art fuel cell system may yield a total weight of nearly 15,000 pounds including the heavy outer pressure hull and the consumable reactants, i.e., fuel and oxygen. However, the pressure equilibrated system may yield a total weight of approximately 4,000 to 5,000 pounds depending on the reactants used. Furthermore, the heavier pressure hull of the prior art system may only be useful to depths of approximately 11,000 feet whereas the pressure equilibrated system may not be so limited by a maximum depth.

Figure 3:
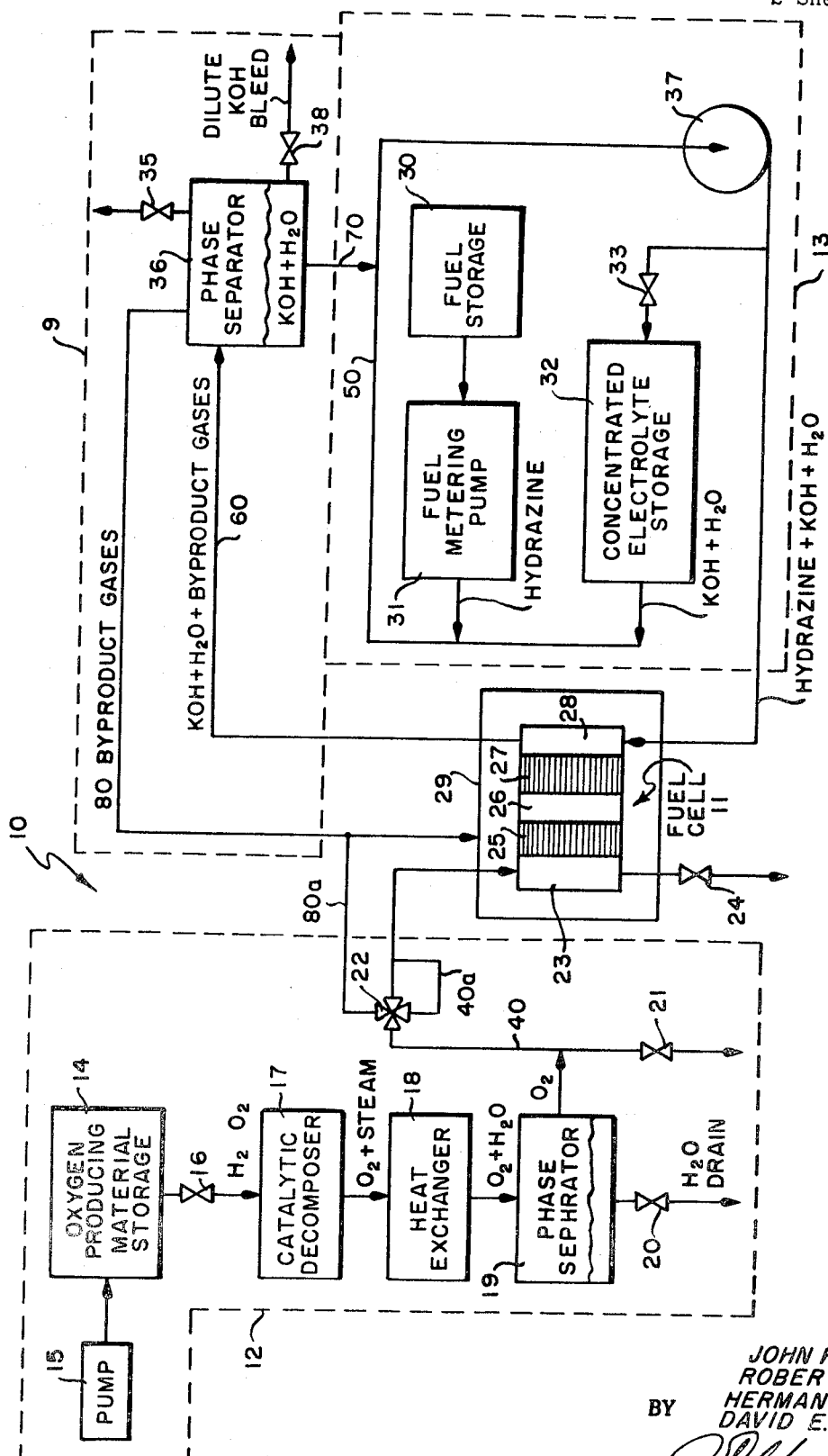
FIG. 3 is a block diagram more specifically illustrating the fuel cell system of FIG. 1.

Referring now to FIG. 3, fuel cell 11 is conventional in its construction and includes oxygen manifold 23; fuel manifold or the hydrazine-electrolyte manifold 28; cathode 25; element 26; and anode 27. Element 26, typically asbestos, must be a layer of material capable of supporting an ionic conductor and functioning as an electronic insulator while additionally serving as an oxygen-fuel barrier.

Fuel cell 11 is further provided with a relatively flexible gastight housing 29 which may comprise a relatively low-strength envelope of a thin metal or plastic such as Polysulfone plastic made by the Union Carbide Company, or if preferred, a housing having a bellows type construction may be used.

Of course, if the pressure within housing 29 was always exactly equal to the ambient sea pressure, the housing would have no strength requirements.

The oxygen producing and feeding portion 12 comprises a means for producing and feeding oxygen to oxygen manifold 23. Included in portion 12 is an oxygen producing material storage unit 14 for storing an oxygen producing material for use by fuel cell 11. The storage unit 14 may comprise a tank enclosing a soft bag of Teflon or polyethylene containing, in this embodiment, a quantity of hydrogen peroxide ($H_2O_2$).

Also included in portion 12 is pump 15 connected to cause the oxygen producing material to pass from storage unit 14 through regulating valve 16. Pump 15 subjects the bag or shell to a differential pressure slightly above the pressure in fuel cell 11 by pumping seawater directly into the aforementioned tank in order to displace the hydrogen peroxide. Indirect pumping of water or other fluids could be used. The surrounding seawater is automatically pumped by pump 15 to storage unit 14 at a pressure slightly above ambient pressure in order to move the hydrogen peroxide through check valve 16. The displaced hydrogen peroxide then flows through regulating valve 16 which is adjusted to the fuel cell demands.

Catalytic decomposer 17 is included in portion 12 and connected to receive the hydrogen peroxide from storage unit 14 for breaking down the material into oxygen and steam. Decomposer 17 may be a conventional silver composition screen.

Heat exchanger 18 of portion 12 is connected to receive the oxygen and steam from decomposer 17 for condensing the steam to water. Heat exchanger 18 may include cold water flow cooling.

Phase separator 19 of portion 12 is connected to receive the oxygen and water from heat exchanger 18 for draining off the water through valve 20 and for allowing the oxygen to flow to fuel cell 11.

Further included in portion 12 is oxygen feed line 40 connecting phase separator 19 to oxygen manifold 23.

Valve 21 is a depressurization relief valve connected to feed line 40 and provided to permit the passage of oxygen therethrough only when the pressure in the fuel cell system exceeds the sea pressure ambient to the system by a preset differential; typically 10 p.s.i. or more.

Valve 22 is a differential pressure regulator in the oxygen feed line 40 to permit the passage of oxygen therethrough to fuel manifold 28. An oxygen bleed valve 24 is provided to purge manifold 23 of contaminants by relieving to permit oxygen to escape outwardly from manifold 23. When this occurs there is a resultant pressure drop in manifold 23 and this pressure drop is sensed by valve 22 which is advantageously keyed to sense the desired pressure within the fuel cell system. The pressure drop is further caused by oxygen being consumed by the fuel cell. As a result, valve 22 permits the passage of oxygen in response to a pressure drop in oxygen manifold 23 and oxygen is thereby supplied to the manifold. When oxygen pressure in manifold 23 exceeds the preset limits of bleed valve 24, another outward surge of oxygen occurs from manifold 23 through valve 24. This sequence is automatically repeated and thus oxygen is constantly supplied to manifold 23. Valve 22 functions as a preset reference which is keyed to the ambient sea presusre and differential pressures in the fuel and oxygen systems due to the interconnection of the fuel cell system components via lines 40, 40a and 80a.

The fuel producing and feeding portion 13 comprises a means for producing a fuel solution and feeding said solution to fuel manifold 28. Included in portion 13 is a fuel storage unit 30 preferably containing hydrazine and an electrolyte storage unit 32 for storing the required electrolyte or electrolyte solution; in this case a water solution of potassium hydroxide ($KOH+H_2O$).

Also in portion 13 is included fuel metering pump 31 for controlling the fuel feeding rate into the system.

Fuel-electrolyte feed line 50 is included in portion 13 to connect fuel storage unit 30, electrolyte storage unit 32 and fuel metering pump 31 for feeding the fuel and electrolyte to fuel manifold 28 via pump 37. As shown, the electrolyte forms a fuel solution with the hydrazine and this solution then feeds into manifold 28. Valve 38 connected to phase separator 36, allows bleeding off of excess electrolyte solution in order to maintain a constant volume of the electrolyte, and valve 33 regulates system pressure to electrolyte storage unit 32.

Means are provided within system 10 for maintaining pressure within housing 29 substantially the same as pressure ambient to the housing. Included in the pressure maintaining means is byproduct-electrolyte feed line 60 connected to feed byproduct gases and electrolyte. Phase separator 36 is connected to byproduct-electrolyte feed line 60 for separating the electrolyte from byproduct gases received from fuel cell 11. In the preferred embodiment byproduct gases generally comprise nitrogen and may include traces of hydrogen and ammonia.

Further included in the pressure maintaining means is return line 70 connecting phase separator 36 to fuel cell 11 via fuel-electrolyte feed line 50 for returning electrolyte to the fuel cell.

Byproduct feed line 80 is included in the pressure maintaining means and is connected to feed byproduct gases from phase separator 36 to housing 29.

Depressurization relief valve 35 is connected to phase separator 36 to permit the passage of byproduct gases therethrough only when the pressure in the fuel cell system exceeds pressure ambient to the system by a preset differential, typically 10 p.s.i. or more. Therefore, valve 35 functionally corresponds in a manner similar to valve 21 previously described. Valve 35 functions as a preset reference keyed to the ambient sea pressure and differential pressures in the fuel system due to the interconnection of the fuel cell system components.

As the fuel solution flows through manifold 28 the hydrazine is consumed and the byproduct gases, nitrogen and traces of hydrogen and ammonia are formed while the electrolyte solutions feeds through. In theory, where all the fuel is consumed by fuel cell 11, only nitrogen would be produced. The byproduct gas and electolyte pass through line 60 to phase separator 36 where the gases and the electrolyte are separated. The electrolyte is returned to fuel cell 11 via return line 70 and fuel-electrolyte feed line 50 while gases are directed from phase separator 36 to housing 29 in order to allow pressurization of the housing through the use of the byproduct gases. It should be noted that valve 35 is provided for relief from over pressurization which can occur due to a high rate of fuel consumption and during ascent from the ocean depths.

A method of maintaining pressure in a relatively flexible fuel cell housing 29 surrounding fuel cell 11 substantially the same as pressure ambient to said housing comprises feeding an oxidant to fuel cell 11 via oxygen feed line 40 and feeding fuel comprising a solution of hydrazine and an electrolyte to fuel cell 11 via fuel-electrolyte feed line 50. Byproduct gases are fed from fuel cell 11 to housing 29 via byproduct-electrolyte feed line 60, phase separator 36 and byproduct feed line 80. Byproduct gas pressure in the fuel cell system is relieved between fuel cell 11 and housing 29 only when the pressure exceeds pressure ambient to housing 29 by a preset differential.

What has been disclosed is a self-pressurized fuel cell system displaying many improved characteristics. The system disclosed is capable of operating at deep ocean depths outside of a pressure hull and displays many improved electrical characteristics. All this is done without substantial additional system complexity or cost and without reducing system reliability. It should be understood, of course, that the foregoing disclosure relates only to a preferred embodiment of the invention and that numerous modifications may be made therein.

What is claimed is:

1. A fuel cell system comprising:
    a fuel cell including an oxygen manifold and a fuel manifold;
    means connected for producing and feeding oxygen to said oxygen manifold;
    means connected for producing and feeding a fuel solution to said fuel manifold;
    a relatively flexible housing surrounding said cell; and
    means connected for maintaining pressure within said housing substantially the same as pressure ambient to said housing including:
    a phase separator;
    a byproduct-electrolyte feed line connected to feed byproduct gases and electrolyte from said fuel cell to said phase separator;
    said phase separator connected to said byproduct-electrolyte feed line for separating the electrolyte from byproduct gases received from said fuel cell;
    a byproduct feed line connected to feed byproduct gases from said phase separator to the interior of said housing; and
    a depressurization relief valve connected to said phase separator to permit the passage of byproduct gases therethrough only when pressure in said fuel cell system exceeds pressure ambient to said system by a preset differential.

2. The fuel cell system of claim 1 wherein said housing comprises: a relatively low-strength plastic material.

3. The fuel cell system of claim 2 wherein said oxygen producnig and feeding means includes:
    an oxygen producing material storage unit for storing an oxygen producing material for use by said fuel cell;
    a pump connected to cause said oxygen producing material to pass from said storage unit through a regulating valve, said valve being adjusted to the fuel cell demands;
    a catalytic decomposer connected to receive said oxygen producing material from said storage unit and to break down said material into oxygen and steam;
    a heat exchanger connected to receive said oxygen and steam from said decomposer and for condensing the steam to water;
    a phase separator connected to receive said oxygen and said water from said heat exchanger for draining off said water and allowing said oxygen to flow to said fuel cell;
    an oxygen feed line connecting said phase separator to said oxygen manifold;
    a depressurization relief valve connected to said oxygen feed line to permit the passage of oxygen therethrough only when the pressure in the fuel cell system exceeds pressure ambient to the system by a preset differential; and
a differential pressure regulator in said oxygen feed line for passing oxygen therethrough in response to a pressure drop in said oxygen manifold.

4. The fuel cell system of claim 3 wherein said means for producing a fuel solution and feeding said solution to said fuel manifold includes:
a fuel storage unit;
an electrolyte storage unit;
a fuel metering pump for controlling the fuel feeding rate into the system; and
a fuel-electrolyte feed line connecting said fuel storage unit, said electrolyte storage unit and said fuel metering pump for feeding said fuel and said electrolyte to said fuel manifold.

References Cited

UNITED STATES PATENTS

| | | | |
|---|---|---|---|
| 3,255,046 | 6/1966 | Ghormley | 136—86 C |
| 3,507,704 | 4/1970 | Webb. | |

FOREIGN PATENTS

| | | | |
|---|---|---|---|
| 964,467 | 2/1962 | Great Britain | 136—86 R |

ALLEN B. CURTIS, Primary Examiner

H. A. FEELEY, Assistant Examiner